United States Patent [19]
Virden et al.

[11] Patent Number: 6,057,890
[45] Date of Patent: May 2, 2000

[54] USER INTERFACE FOR TELEVISION SCHEDULE SYSTEM IN WHICH THE FUTURE EVENTS ARE PAGED IN TIME

[75] Inventors: Steven P. Virden; Rex Povenmire, both of Monument, Colo.

[73] Assignee: EchoStar Engineering Corp.

[21] Appl. No.: 08/989,260

[22] Filed: Dec. 12, 1997

Related U.S. Application Data

[60] Provisional application No. 60/032,948, Dec. 12, 1996.
[51] Int. Cl.[7] ................................................... H04N 5/445
[52] U.S. Cl. ............................ 348/563; 348/906; 348/12; 345/327
[58] Field of Search ..................................... 348/563, 906, 348/460, 12, 13, 7, 6, 569; 345/326, 327

[56] References Cited

U.S. PATENT DOCUMENTS

| | | |
|---|---|---|
| 5,353,121 | 10/1994 | Young et al. . |
| 5,532,754 | 7/1996 | Young et al. . |
| 5,671,411 | 9/1997 | Watts et al. ............................... 348/906 |
| 5,699,107 | 12/1997 | Lawler et al. ........................... 348/906 |
| 5,710,601 | 1/1998 | Marshall et al. ........................ 348/906 |
| 5,731,844 | 3/1998 | Rauch et al. ............................. 348/563 |
| 5,822,123 | 10/1998 | Davis et al. ............................. 348/906 |

*Primary Examiner*—Andrew I. Faile
*Assistant Examiner*—Reuben M. Brown

[57] ABSTRACT

An interface for a television system whereby a user, while viewing a television program, can upon demand via remote control view information in a banner overlaid on the currently displayed program. The banner may contain descriptions of programs being aired currently on all available channels, and descriptions of programs that are scheduled for future broadcasts on all available channels. The user can jump through the channel timeslots by manipulating keys on the keypad or remote control to input the number of hours to jump ahead or back. Program scheduling is provided by an electronic program guide that is received with the television signals and stored in the television receiver.

14 Claims, 3 Drawing Sheets

USER INTERFACE FOR TELEVISION SCHEDULE SYSTEM IN WHICH THE FUTURE EVENTS ARE PAGED IN TIME

This application claims the benefit of U.S. provisional application Ser. No. 60/032948, filed Dec. 12, 1996, which is co-pending.

FIELD OF THE INVENTION

The present invention relates to an interface between a user and an electronic programming guide (EPG). Specifically, the present invention relates to a method and apparatus for accessing EPG information for events to be shown on television in the future. More specifically, the present invention relates to a method and apparatus for directly accessing desired timeslots in an EPG and manually updating an EPG.

BACKGROUND OF THE INVENTION

With the proliferation of subscription television programming, the drastic increase in the number of available channels and subsequent increase in television programming has heightened the need for an effective onscreen programming directory. Early attempts at a solution dedicated a channel to providing an onscreen directory, with programming information for each channel scrolling vertically across the screen. However, with the large number of channels, this technique proved inefficient because the viewer was required to spend an exorbitant amount of time waiting for the desired information to appear on the screen, while missing programming being shown on the other channels.

An EPG is used with television systems to allow users to examine scheduling information describing television programming to be broadcast in the future. In direct broadcast satellite (DBS) systems, EPG information is periodically downloaded and updated, usually at regular intervals. In the prior art, it was possible to examine scheduling information but the user was forced to scroll sequentially through listings corresponding to one-half hour increments. In order to examine scheduling information several days in advance, considerable time was required to scroll through the EPG to the desired timeslot. Storing the EPG in memory and performing periodic updates also proved inconvenient, as EPG information that may be available in the data stream may nonetheless be unavailable to users until the DBS receiver performs an update of the EPG information stored in memory.

There is a strong need for a user interface that provides a user with direct access to individual timeslots in the EPG, and enables the user to obtain the most current EPG information available.

PRIOR ART DISCLOSURE STATEMENT

In the Young et al. (U.S. Pat. No. 5,532,754 and U.S. Pat. No. 5,353,121), banners are used on a television screen to display programs which are currently being shown or will be shown in the future. However, neither the '121 patent nor the '754 patent teach direct access to specific timeslots, nor manual updating of EPG information by a user from a downlinked EPG source.

SUMMARY OF THE INVENTION

The present invention uses an EPG to control the selection of television channels to view in a Digital Broadcast Satellite (DBS) System. EPG information is downlinked in MPEG-2 format via a direct broadcast satellite and assembled in the memory of a DBS receiver. EPG information is periodically downloaded and updated, usually at regular intervals.

In one aspect of the present invention, users may directly access specific timeslots within the EPG by specifying a number of hours from the current location within the EPG, thus eliminating the inconvenience of scrolling through a large number of timeslots. The user may also move in both directions within the EPG, forward and back, by first choosing the required number of hours from the current position in the EPG to access the desired timeslot, and then choosing the direction.

In another aspect of the present invention, a user may manually update the EPG stored in memory without having to wait for a periodic update to be performed. If the user attempts to access a timeslot that has not yet been extracted from the data stream and is not contained in the EPG stored in memory, the DBS receiver will examine the incoming data stream for EPG information corresponding to the selected timeslot, and will update the EPG stored in memory if the desired information is extracted from the incoming data stream. Other features and advantages of the present invention will become apparent from the following detailed description of the invention when it is considered in conjunction with the accompanying drawings.

DETAILED DESCRIPTION OF THE INVENTION

Figure 1:
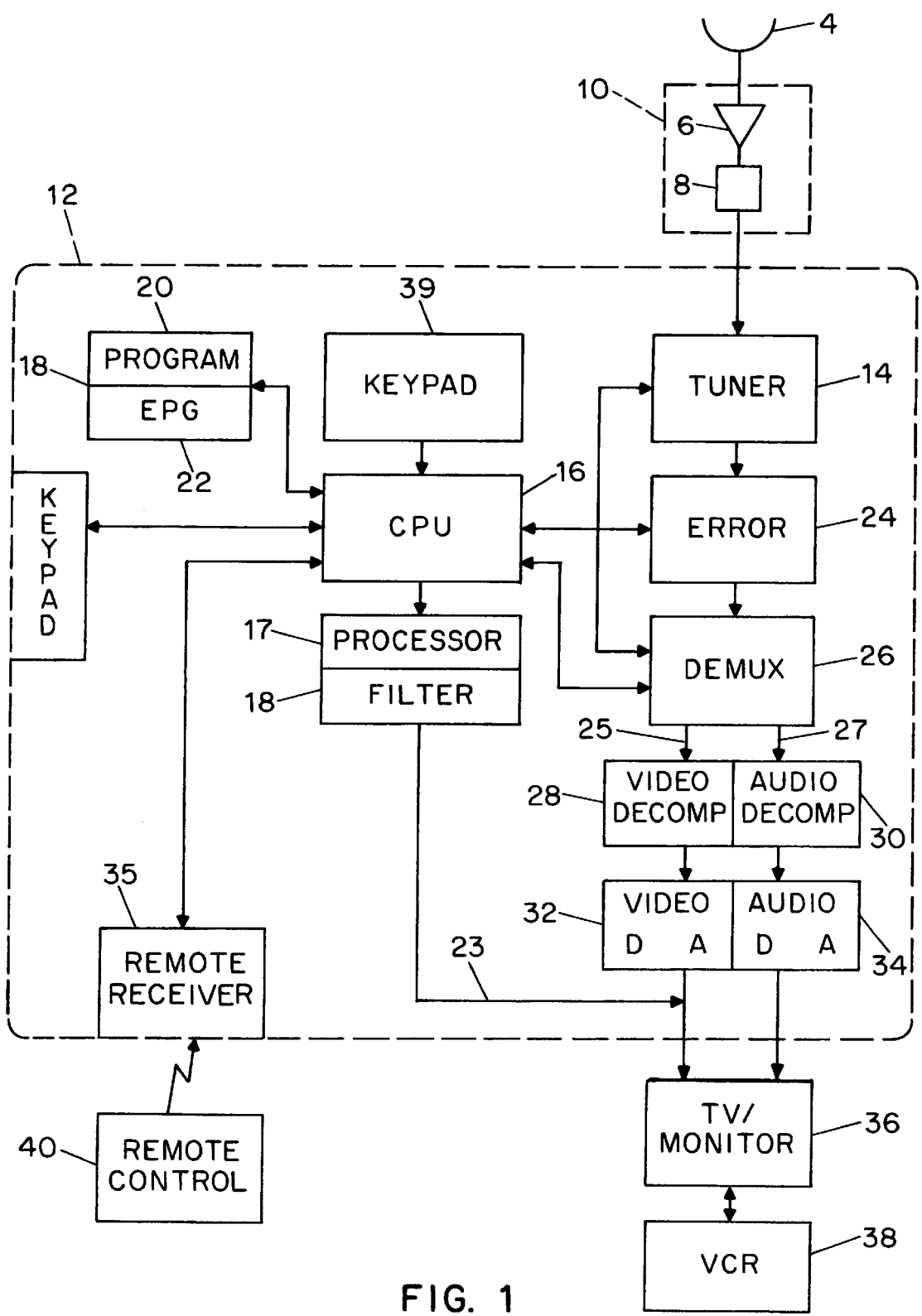
FIG. 1 is a block diagram illustrating the major components of a direct broadcast satellite television system that interact with the EPG according to the present invention.

FIG. 1 is a block diagram that shows the related components required to practice the present invention. The preferred embodiment utilizes a direct broadcast satellite system incorporating packetized transmission according to the MPEG-2 standard, but may be used with any programming source that includes an EPG. Encrypted direct broadcast satellite (DBS) signals are received as downlinked signals 2 by satellite antenna 4, a parabolic dish of approximately eighteen to thirty-six inches in diameter. Front end processing of the satellite signal is accomplished by a low noise block converter feed (LNBF) provided in the antenna focal point. This includes a converter module 10 with a low noise amplifier 6 which receives the signals from the feed and by means of the down converter 8 converts the entire frequency band of the satellite signals to a lower frequency range which can be efficiently transmitted via coaxial cable to the satellite receiver 12. Tuner 14 selects a specific channel from the downlinked signal 2 and feeds it to error correction and packet synchronization module 24. In the preferred embodiment, the error correction and packet synchronization module 24 combines a QPSK decoder and a Reed-solomon and Viterbi forward error corrector. The QPSK decoder accepts the digital signals from tuner 14 and converts them to data and checksum bits corresponding to packets in the data stream 2. The forward error correction logic accepts the data and checksum bits and corrects errors that occurred in the transmission of data stream 2. The error correction and packet synchronization module 24 outputs a fully compliant MPEG-2 transport stream as defined by the ISO 13818-2 MPEG specification. Output from the error correction and packet synchronization module 24 is directed to the packet demultiplexer 26.

The packet demultiplexer 26 is an integrated circuit that accepts the packetized, time domain multiplexed data stream of the MPEG-2 transport stream and routes the packets to various areas within satellite receiver 12. Audio is output as audio stream 27, and is accepted by the audio decompresser 30. Video is output as video stream 25, and is accepted by the video decompresser 28. Audio stream 25 and video stream 27 are fully compliant audio and video program Elementary Streams as defined by ISO 13818-2 and ISO 13818-3 of the MPEG-2 standard, respectively. In addition to routing packets of data, packet demultiplexer 26 also descrambles encrypted data, provides various buffering of the MPEG data, and handles the program clock reference to keep the local clock synchronized with the clock at the uplink center. Data 29 is output from demultiplexer 26 and is routed to central processing unit 16, which assembles it into the EPG 22 stored in memory 18.

Video decompresser 28 and audio decompresser 30 accept video stream 25 and audio stream 27, respectively, and decompress them into baseband digital signals. The video stream 25 is then fed to video digital to analog converter 32 and the audio stream 27 is fed to video digital to analog converter 34. Converters 32 and 34 decode the digital signals and output the resulting analog baseband signals to TV/monitor 36 and VCR device 38.

In the preferred embodiment, EPG 22 is a data base containing information including names or titles of viewing events, corresponding channel numbers and names, brief descriptions of the programs, start and finish times, and rating and content information related to the events. Central processing unit 16 executes the EPG program 20, which takes the information stored in the EPG 22 and outputs a bit map file 21 to processor 17. Processor 17 processes the bit map file 21 and outputs a signal, which after being filtered by filter 19 becomes a video baseband signal 23 that may be combined with video baseband signal 25 to be displayed on television/monitor 36.

A user may manipulate the satellite receiver 12 via keypad 39 or remote control device 40. Remote control device 40 communicates with CPU 16 by sending an infrared or other RF signal to remote receiver 35, which transfers the commands to CPU 16.

The EPG program 20 is an instruction set that creates the EPG 22 and allows a user to manipulate the EPG 22. While the EPG program 20 could be implemented as hardware, in the preferred embodiment the EPG program 20 is a software program stored in memory 18. Memory 18 is preferably DRAM, but also may be flash, ferroelectric, or other non-volatile memory, or conventional RAM with a battery backup. In the preferred embodiment, the LSI 64002 microprocessor may be used for central processing unit 16. Also in the preferred embodiment, processor 17 may be an NTSC processor, such as the Sony CXD 1910.

Figure 2:
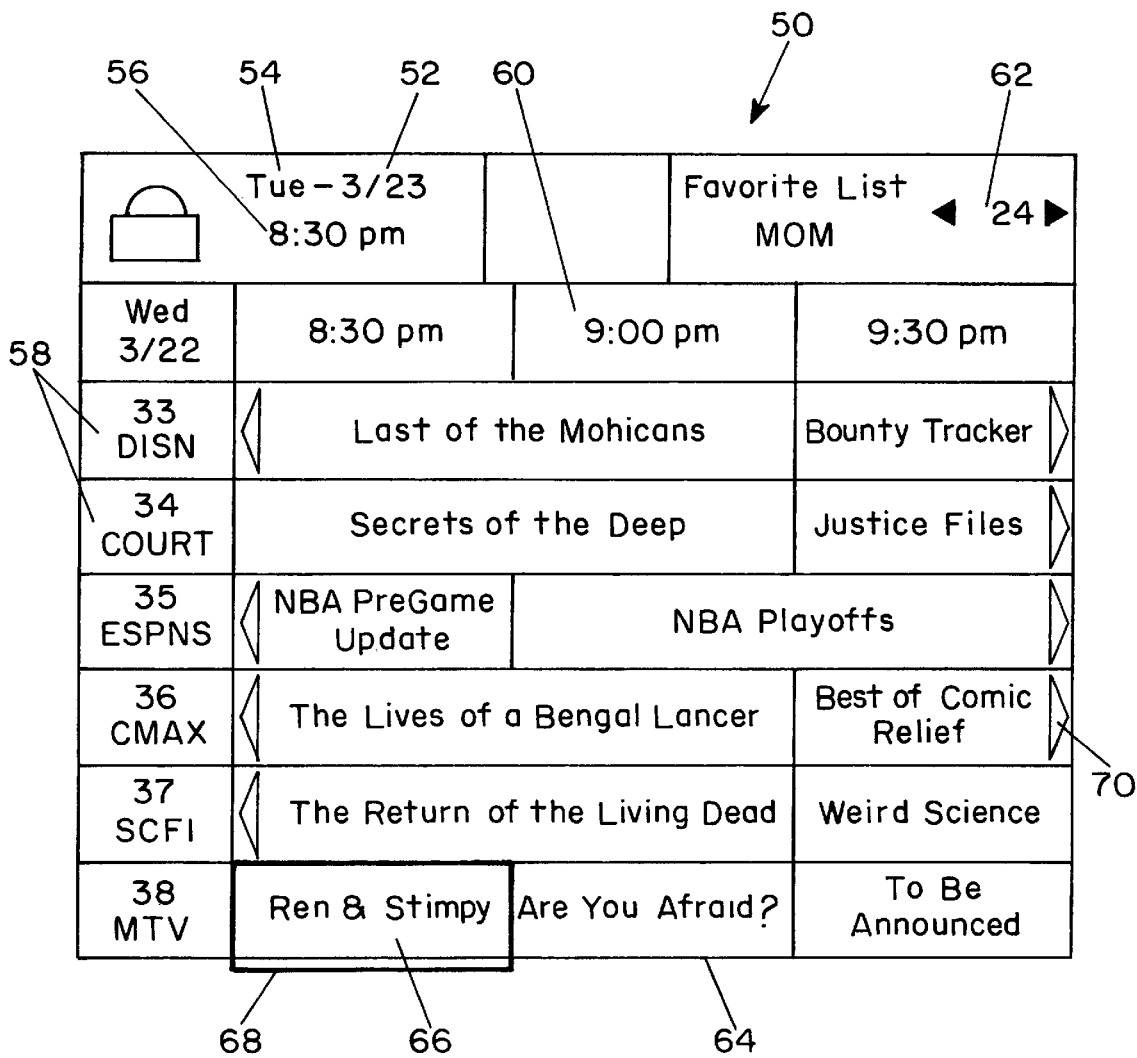
FIG. 2 is a display illustrating programming selections contained in the EPG as displayed on a television screen.

Directing attention to FIG. 2, event information contained in EPG 22 is displayed on TV/monitor 36 in the form of screen 50. Screen 50 allows the user to examine event information contained in EPG 22 for programming events scheduled for up to at least two days into the future. A user may summon screen 50 by pressing the GUIDE key on remote control device 40 or keypad 39.

Current date 52, day of the week 54, and time 56 are displayed in the upper left corner of the screen. Screen 50 lists channels 58 in a column at the left edge of the screen, and timeslots 60 in a row across the top of the screen. In the preferred embodiment, timeslots 60 are divided into 30 minute intervals, but other intervals may be used. Titles or descriptions corresponding to individual events 66 are displayed in the center of screen 50, in the grid 64 defined by channels 58 and timeslots 60. If an event has an air time exceeding the timeslot in which it is currently displayed, an arrow 70 will appear in the event that indicates the adjacent timeslot in which the event may be viewed. Upon summoning of screen 50, the cursor 68 will be placed upon the event 66 corresponding to the programming selection currently being viewed. The cursor 68 may be implemented by drawing a box around the event, or highlighting the event. An event 66 is selected for viewing by moving the cursor 68 to the desired event via arrow keys located on the remote control device 40 or keypad 39 and pressing the SELECT key. If a Pay-per-view (PPV) event is selected, the user is given the opportunity to purchase the event. If the selected event is to be shown in the future, the user can set up an event timer.

The user can traverse the channels 58 by scrolling via the vertical arrow keys on the remote control device 40 and keypad 39. Timeslots 60 may be traversed either by scrolling via the left and right arrow keys, or by specifying a number of hours in box 62 located in the upper right corner of the screen. The number of hours available to the user is dependent on the total amount of information contained in the downlink datastream.

The user may traverse the timeslots 60 by entering the number of hours into the box 62 and then pressing one of the horizontal arrow keys. When a number is entered (for example 24 hours), it is displayed in the area enclosed by the two arrows as shown in box 62. If the right arrow key is pressed after entering a number, screen 50 displays the timeslot located (in this example) 24 hours later than the timeslot indicated by the cursor 68, and the cursor is moved to the event corresponding to the new timeslot and currently selected channel. If the left arrow key is pressed after entering a number, screen 50 displays the timeslot located (in this example) 24 hours earlier than the timeslot indicated by the cursor 68, and the cursor is moved to the event corresponding to the new timeslot and currently selected channel.

If the desired event information is not currently in memory, the system must access the information from the MPEG-2 downlink datastream. A message appears on TV/monitor 36 informing the user that the system is retrieving EPG information from satellite, and allows the user to either wait for the update or cancel the operation. If the desired information is not contained within the data stream 2, the user is informed; otherwise, the desired information is displayed on TV/monitor 36.

Figure 3:
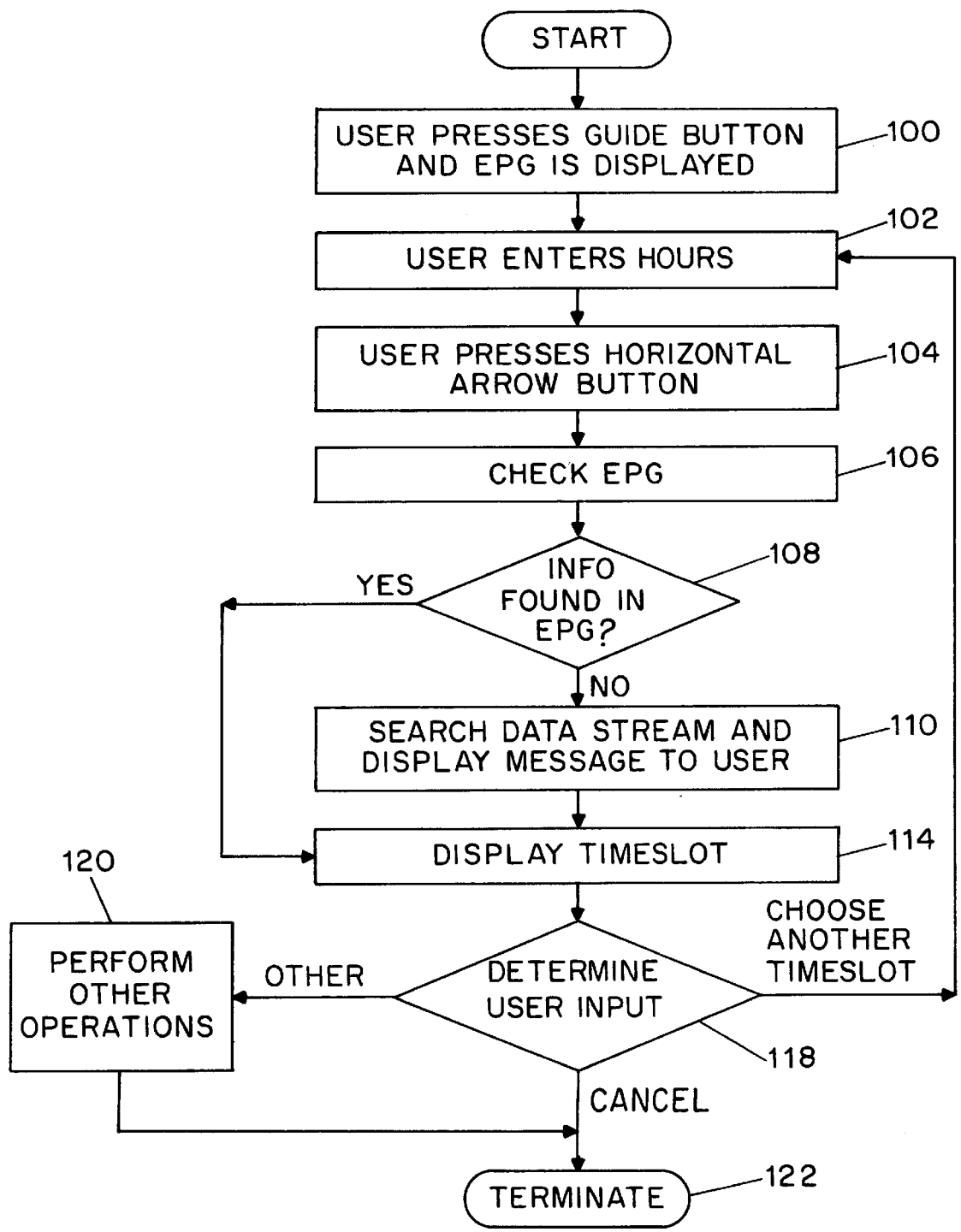
FIG. 3 is a flow chart illustrating the logical sequence of steps executed by the present invention.

Referring to FIG. 3, the logical sequence of steps executed by EPG program 20 to operate the present invention is described using a flow chart. Program control begins at Step 100 where the user summons the EPG program 20 by pressing the GUIDE key on the remote control device 40 or keypad 39. EPG information is displayed on TV/monitor 36 as shown in FIG. 2. Program control continues to step 102, where the user enters the number of hours corresponding to timeslots 60 he wishes to traverse. The entered number of hours is displayed in box 62. Continuing to Step 104, the user indicates a horizontal arrow that indicates which direction to traverse the EPG 22. For instance, if 24 is displayed in box 62 and the user presses the right horizontal arrow button, all listings corresponding to the timeslot listed 24 hours later than the currently selected timeslot are displayed. If instead the left arrow is pressed, all listings corresponding to the timeslot listed 24 hours before the currently selected timeslot are displayed. At Step 106, the EPG program 20 checks memory 18 to see if the EPG information corresponding to the indicated timeslot is contained in the EPG 22. Depending on whether the information is contained in the EPG 22 (Step 108) the EPG program 20 will either display the desired timeslot (Step 114) or search the data stream 2 for the information corresponding to the desired timeslot (Step 110). Also at Step 110, the user is informed that the EPG program 20 is searching for the desired timeslot. Depending on user input (Step 118), program control may return to Step 102, where the user may access a different timeslot. Program control may also continue to Step 120, where the user may perform different operations from the EPG 22, such as selecting a program for viewing, or setting an event timer. The user may also escape from the EPG program 20, and the EPG program 20 terminates at Step 122.

While an improved interface for a television system incorporating an EPG has been shown and described in detail in this application, it is to be understood that this invention is not to be limited to the exact form disclosed and changes in detail and construction of the various embodiments of the invention may be made without departing from the spirit thereof.

What is claimed is:

1. A method of displaying program information on a viewing screen, said method comprising the steps of:
    (a) providing an electronic programming guide means, said electronic programming guide means being divided into timeslots containing program information, said timeslots divided into current timeslots containing program information corresponding to programs being broadcast currently and future timeslots containing program information corresponding to programs scheduled for future broadcasts,
    (b) displaying program information from said displayed timeslots on a viewing screen;
    (c) allowing a user to traverse said electronic programming means and cause information from said displayed and undisplayed timeslots to be displayed on said viewing screen; and
    (d) said traversing is accomplished by the user inputting a predetermined time period corresponding to a desired timeslot causing the desired timeslot to be displayed on said viewing screen.

2. A method for displaying program information as described in claim 1, wherein said program information corresponds to viewing selections transmitted on one or more channels during said timeslots.

3. A method for displaying program information as described in claim 1, further comprising the step of changing a currently displayed viewing selection to correspond to one of said displayed timeslots.

4. A method for displaying program information as described in claim 1, further comprising the step of allowing said user to summon and dismiss said electronic programming guide means from said viewing screen.

5. A method for displaying program information as described in claim 1, further comprising the step of controlling an event timer means to respond to one or more of said future timeslots.

6. A method for displaying program information as described in claim 1, further comprising the step of updating said electronic programming guide means.

7. A method for displaying program information as described in claim 6, further comprising the step of allowing a user to control said updating of said electronic programming guide means.

8. A method for displaying program information as described in claim 1, wherein said step of allowing a user to traverse said Electronic Programming Guide means includes the step of said user selecting a specific future timeslot and said step of displaying includes the step of displaying program information for all channels available at said specific timeslot.

9. Apparatus for allowing a user to selectively view electronic programming guide information on a viewing screen while simultaneously displaying on said viewing screen viewing selections and an electronic programming guide means, said electronic programming guide means comprising current timeslots containing program information corresponding to programs being broadcast currently and future timeslots containing program information corresponding to programs scheduled for future broadcasts, said apparatus comprising:
    (a) receiving means for receiving said viewing selections and electronic programming guide information;
    (b) selecting means for selecting one or more said undisplayed timeslots to be displayed on said viewing screen, said selecting means including means whereby the user can input a predetermined time period for selected timeslots; and
    (c) displaying means for overlaying said preselected timeslots to be displayed on a currently displayed viewing selection.

10. Apparatus for allowing a user to selectively view electronic programming guide information as defined in claim 9, wherein said selecting means allows a user to selectively browse through said timeslots of electronic programming guide means corresponding to viewing selections shown on one or more channels and at one or more broadcast times.

11. Apparatus for allowing a user to selectively view electronic programming guide information as defined in claim 10, wherein said selecting means comprises remote control means for entering user input.

12. Apparatus for allowing a user to selectively view electronic programming guide information as defined in claim 10, further comprising event timer means, said event timer means receiving user input from said selecting means.

13. Apparatus for allowing a user to selectively view electronic programming guide information as defined in claim 12, wherein said receiving means comprises a tuning means, and said event timer means comprises a controlling means for directing said tuning means to tune to a channel corresponding to said selected timeslots of said electronic programming guide means.

14. Apparatus for allowing a user to selectively view electronic programming guide information as defined in claim 12, wherein said selecting means comprises means for selecting one of said future timeslots, and said display means comprises means for displaying program information for all channels corresponding to said selected future timeslot.

* * * * *